(12) United States Patent
Hintersteiner et al.

(10) Patent No.: US 10,889,722 B2
(45) Date of Patent: Jan. 12, 2021

(54) COATING POWDER FORMULATION

(71) Applicant: TIGER COATINGS GMBH & CO. KG, Wels (AT)

(72) Inventors: Ingrid Hintersteiner, Wels (AT); Carsten Herzhoff, Wels (AT); Thomas Roitner, Wels (AT); Gerhard Buchinger, Wels (AT)

(73) Assignee: Tiger Coatings GmbH & Co. KG, Wels (AT)

( * ) Notice: Subject to any disclaimer, the term of this patent is extended or adjusted under 35 U.S.C. 154(b) by 35 days.

(21) Appl. No.: 16/318,972

(22) PCT Filed: Jul. 21, 2017

(86) PCT No.: PCT/EP2017/068463
§ 371 (c)(1),
(2) Date: Jan. 18, 2019

(87) PCT Pub. No.: WO2018/015530
PCT Pub. Date: Jan. 25, 2018

(65) Prior Publication Data
US 2019/0256718 A1    Aug. 22, 2019

(30) Foreign Application Priority Data
Jul. 21, 2016    (EP) .................... 16180541

(51) Int. Cl.
| C09D 5/03 | (2006.01) |
| C08G 63/20 | (2006.01) |
| C08G 63/183 | (2006.01) |
| C08G 63/54 | (2006.01) |
| C08G 63/78 | (2006.01) |
| C09D 167/02 | (2006.01) |
| C09D 167/06 | (2006.01) |
| C08F 299/04 | (2006.01) |
| C09D 187/00 | (2006.01) |

(52) U.S. Cl.
CPC .............. *C09D 5/03* (2013.01); *C08F 299/04* (2013.01); *C08G 63/183* (2013.01); *C08G 63/20* (2013.01); *C08G 63/54* (2013.01); *C08G 63/78* (2013.01); *C09D 167/02* (2013.01); *C09D 167/06* (2013.01); *C09D 187/00* (2013.01)

(58) Field of Classification Search
CPC ...................................................... C09D 5/03
USPC .................................................. 528/30, 304
See application file for complete search history.

(56) References Cited

U.S. PATENT DOCUMENTS 3,331,891 A    7/1967    Thomas et al.

FOREIGN PATENT DOCUMENTS

| CN | 105765001 | 7/1916 |
| CN | 1221759 | 7/1999 |
| CN | 100567424 | 12/2009 |
| CN | 100572473 | 12/2009 |
| CN | 102884132 | 1/2013 |
| CN | 103930220 | 7/2014 |
| EP | 0309088 | 3/1989 |
| EP | 0844286 | 5/1998 |
| EP | 0957141 | 11/1999 |
| EP | 0980901 | 2/2000 |
| EP | 1043138 | 10/2000 |
| EP | 1538186 | 6/2005 |
| EP | 2342286 | 6/2014 |
| EP | 2342287 | 8/2016 |
| EP | 2566923 | 1/2017 |
| JP | 2001262010 | 9/2001 |
| WO | WO 1993/019132 | 9/1993 |
| WO | WO 2010/052290 | 5/2010 |
| WO | WO 2014/173861 | 10/2014 |
| WO | WO 2015/158587 | 10/2015 |

OTHER PUBLICATIONS

International Search Report and Written Opinion issued in International Patent Application No. PCT/EP2017/068463, dated Oct. 9, 2017.
Office Action Issued in Corresponding Chinese Patent Application No. 201780045054.1, dated Oct. 23, 2020.
Satas & Tracton, Coatings Technology Handbook (Second Edition), ISBN-10: 0824704398, New York, NY, 2001.
Tuliao Kexue, Jishu Jichu Congshu, Tuliao Shuzhi Huaxue, pp. 72-76, 2007.

*Primary Examiner* — Duc Truong
(74) *Attorney, Agent, or Firm* — Norton Rose Fulbright US LLP

(57) ABSTRACT

The present invention relates to a powder coating formulation, comprising at least one partially crystalline thermoplastic unsaturated polyester (A), at least one thermoplastic allyl prepolymer (B) which is copolymerizable with said polyester, and a thermal initiation system (C), including at least one thermal initiator, wherein the allyl prepolymer (B) has a weight average molar mass greater than 5000 g/mol, preferably greater than 10000 g/mol, and particularly preferably greater than 20000 g/mol, and/or has a viscosity of 30 mPas to 200 mPas, preferably of between 40 mPas and 170 mPas, particularly preferably of between 50 mPas and 150 mPas, and wherein the unsaturated polyester (A) has a melting point of between 90 and 120° C., preferably of 90-110° C., particularly preferably of 90-105° C., and still more preferably of 90-100° C.

16 Claims, No Drawings

COATING POWDER FORMULATION

CROSS-REFERENCE TO RELATED APPLICATIONS

This application is a national phase application under 35 U.S.C. § 371 of International Application No. PCT/EP2017/068463, filed Jul. 21, 2017, which claims priority to and the benefit of European Patent Application No. 16180541.1, filed Jul. 21, 2016. The contents of the referenced patent applications are incorporated into the present application by reference.

FIELD OF THE DISCLOSURE

The present invention relates to a powder coating formulation, comprising at least one partially crystalline thermoplastic unsaturated polyester (A), at least one thermoplastic allyl prepolymer (B) which is copolymerizable with said polyester, and a thermal initiation system (C).

DESCRIPTION OF RELATED ART

In contrast to solvent based coatings, powder coatings are a very environmentally friendly kind of a coating material. In particular, the nearly complete degree of material utilization, the freedom from VOC content, and its simple application are leading to an increase in the market share of powder coatings. However, due to the relatively high baking temperature of typically between 150 and 200° C., the coating of heat-sensitive substrates with powder coatings presents a technological challenge.

Heretofore, accelerated epoxy/polyester powder coatings (hybrid powder coatings) have usually been employed for the coating of heat-sensitive substrates which are characterized by low baking temperatures and a markedly improved UV resistance compared to epoxy resin powder coatings. Apart from the mentioned hybrid formulations, radically curing systems have been employed both currently and in the past. For these systems, only minor amounts of crystalline or partially crystalline resins are recommended in the state of the art, in particular because a homogeneous mixing of such resins with amorphous resins proves to be difficult due to clearly varying melting viscosities. In addition, due to a strong viscosity reduction and a subsequent inviscidity as a result of using crystalline resins, the edge coverage may turn out to be insufficient.

There are a few documents which suggest (partially oligomeric) vinyl or allyl ether urethanes in combination with unsaturated polyesters for the coating of temperature sensitive substrates with radically curing powder coatings, such as EP 2 342 286 B1, WO 2010/052290 A1, EP 2 342 287 A1, WO 2014/173861, and WO 1993/019132. Even though the group of vinyl ether urethanes, in particular, may undergo very fast polymerization reactions with unsaturated polyesters, which makes it well suited for low temperature applications in the field of powder coatings, the highly restricted commercial availability of this group constitutes a great disadvantage. Technical further developments of potential powder coatings are thus limited.

There is a limited number of documents of the prior art for systems, comprising the commercially more widely available and more strongly pre-polymerized allyl prepolymers. Disadvantageous of them are the higher curing temperatures described in the literature, which are required due to their substantially higher molar mass and the higher viscosity associated with it.

EP 0 309 088 B1 describes a powder composition for an in-mold process, including at least one unsaturated polyester and at least one copolymerizable second resin, as well as an amount of an initiator sufficient to crosslink the mixture which in turn consists of a mixture of a rapid and a slow initiator. EP 1 043 138 A1 relates to thermosetting resins for use as a surface coating of glass fiber reinforced molded articles in the mold wherein the resins are in powder form. The powder is applied to the surface of the mold preferably when the surface of the mold is sufficiently hot to cause melting of the powder particles and to partially cure the film resulting from this. Thereafter, the mold coated like this is filled with a fluid, thermally curing filling resin with or without a glass fiber reinforcement. The combined curing of the coating and the filling resin is effected under applied pressure (in a press). The systems described in these two disclosures are aimed at making use of the powder-in-mold-coating (PIMC) process. Even though lower curing temperatures can be reached hereby, compared to conventional powder coating systems, these are still in a temperature range with lower curing temperatures of about 150° C. which is clearly too high for heat-sensitive substrates. In addition, flowing and leveling, i.e. the melting viscosity, does not play a role in PIMC, resulting in far higher coating thicknesses and needing a cure under pressure which is not the case in powder coatings and is even undesirable. As is known from prior art, atmospheric oxygen may inhibit the curing process at the surface of radically cured coatings which results in soft surfaces. This is not relevant in PIMC due to curing in a press under pressure (closed system), whereas in powder coating this aspect comes into particular effect. Ultimately, aesthetic properties of the obtained coating are of no relevance in PIMC.

U.S. Pat. No. 3,331,891 describes a composition in powder form, comprising allyl prepolymers and unsaturated polyesters, with thermal curing. Hereby, the number average molar mass of the allyl prepolymer is maximally 25,000 g/mol, and per 100 parts of the allyl prepolymer, and there will be included 5 to 50 parts of an unsaturated polyester having a melting point of between 35 and 120° C., and a maximum of 10 parts of a diallyl phthalate monomer. In addition, the composition includes a polymerization catalyst. Despite this polymerization catalyst, curing temperatures ranging from 150-160° C. are still required for this composition in order to achieve an adequate crosslinking of this system. The compositions disclosed in this document do not enable the coating of temperature-sensitive substrates, and the high baking temperatures for the coatings stated in the examples result in particular from the high proportion of diallyl phthalate prepolymer of at least two third based on the binding agent and from the high viscosity in the system caused by this. Further, the employed polyester is not focussed on viscosity lowering, partially crystalline resins, and therefore no viscosity reduction can be achieved even with the addition of this component.

EP 0 844 286 A1 refers to a powder coating composition having a dual curing mechanism, comprising a resin with reactive unsaturated groups, such as unsaturated polyesters, unsaturated polyacrylates, unsaturated polymethacrylates, or mixtures thereof, a copolymerizable second resin having either a vinylester group, an acrylate group, a methacrylate group, an allylester group, or mixtures thereof, together with a photoinitiator and a thermal initiator. EP 0 980 901 A2 and EP 1 538 186 A1 both describe radically curing systems with UV initiation. Both systems are not appropriate for three-dimensional substrate geometries, irrespective of making use of dual curing or curing by UV.

EP 0 957 141 B1 describes a 2K system containing in the first component an unsaturated polyester and a free radical initiator and in the second component a polymerization accelerator. However, in a further document (WO 2015/158587), based on a 2K system with a vinylether urethane crosslinker for curing, the properties of the system described in EP 0 957 141 B1 which is based on allyl prepolymers, are described as being inadequate with respect to storage stability, extrudability, and swelling capacity.

CN 102884132 A and EP 2 566 923 A1 describe a heat curable powder coating composition, comprising at least one crystalline polyester resin and at least one amorphous polyester resin, at least one curing agent and at least one thermal radical starter, wherein the at least one crystalline polyester resin and/or the at least one amorphous polyester resin has diacid ethylenical unsaturations, the at least one curing agent is either crystalline or amorphous, and the at least one curing agent has reactive unsaturations, which can be crosslinked with the ethylenic double bonds of the diacid ethylenical unsaturations of the at least one crystalline polyester resin and/or the at least one amorphous polyester resin. Hereby, the fact is of disadvantage that the curing agent is molecular or oligomeric (low molar mass) and, by diffusion, may thus migrate to the surface during film formation or storage, and consequently during its usage as well. Within the scope of a few experiments, this effect of "blooming" of low molecular compounds could be shown for numerous powder coating compositions, and besides, this effect constitutes a problem known in the prior art.

SUMMARY OF THE INVENTION

It is an object of the present invention to overcome the disadvantages of the stated prior art with regard to powder coating formulations, comprising unsaturated polyesters and allyl prepolymers with a thermal initiator, in terms of baking temperatures which are too high for heat-sensitive substrates, problems associated with insufficient curing by UV or dual curing, as well as inadequate storage stability, poor resistance to cold fluids or a deficient swelling capacity. Swelling capacity within the meaning of the invention is shown by the so-called water swelling test based on IKEA test standard IOS-TM-0022.

DETAILED DESCRIPTION OF THE INVENTION

According to the present invention this object is solved by providing a powder coating formulation, comprising at least one partially crystalline thermoplastic unsaturated polyester (A), at least one thermoplastic allyl prepolymer (B), which is copolymerizable with polyester (A), and a thermal initiator (C), such that the allyl prepolymer (B) has a weight average molar mass greater than 5000 g/mol, preferably greater than 10000 g/mol, and particularly preferably greater than 20000 g/mol, and/or a viscosity of 30 mPas to 200 mPas, preferably of between 30 mPas and 170 mPas, particularly preferably of between 30 mPas and 150 mPas, and wherein the unsaturated polyester (A) has a melting point of between 90 and 120° C., preferably of 90-110° C., particularly preferably of 90-105° C., and still more preferably of 90-100° C. According to the invention, powder coating systems are provided for the first time which can be cured at very low baking temperatures. In particular, temperature-sensitive substrates such as materials based on wood or plastics may be coated with the powder coating formulation of the invention at low baking temperatures und short baking times. Surprisingly, it has been found that the powder coating formulation of the invention yields an optimum with respect to reactivity, in order to be able to coat heat-sensitive substrates and to achieve sufficient flowing/leveling of the coating, as well as to stability which is necessary for processing and storing the powder coating. This is realized by curing two binder components of very diverse properties which are copolymerizable with each other, with the help of adding a thermal initiator. In this system, the allyl prepolymer (B) represents the more (highly) viscous, amorphous component, whereas the at least one partially crystalline, unsaturated polyester (A) having a defined melting point above the melting point constitutes the viscosity reducing component.

The melting point Tm of the at least one partially crystalline, unsaturated polyester is decisive for reactivity and stability of the powder coating formulation of the invention. The melting point of 90-120° C., preferably of 90-110° C., particularly preferably of 90-105° C., still more preferably of 90-100° C., enables a high reactivity and thus the coating of temperature-sensitive substrates. Melting temperatures below the ranges mentioned before lead to problems in processing the powder coatings, such as sticking onto the cooling roll. Melting temperatures, which are above the temperature ranges of the invention, require higher baking temperatures for the powder coatings, which once again is unfavorable for heat-sensitive substrates.

Advantageously, the allyl prepolymer (B) in the powder coating formulation of the invention is a polymer of ortho- or meta-phthalic acid diallyl ester. Surprisingly it has emerged that the use of such a prepolymer having the mentioned range of molar mass, which prepolymer may crosslink with the unsaturations of polyester (A) via its allyl groups, at the same time enables a well controllable process window for the production of the powder coating without negatively impacting the flowing/leveling of the curing powder coat layer. Surprisingly, by combining the polyester and the prepolymer of the invention especially in an amount of the ortho- or meta-phthalic acid diallylester prepolymer in the preferred range of 20-60%, based on the binding agent, overheating and subsequent undesired pre-reactions during the extrusion process associated with it could be prevented, simultaneously with a sufficiently high dispersion.

In another preferred embodiment of the present invention, the allyl prepolymer (B) is a polyester, which contains allyl groups.

A preferred embodiment of the powder coating formulation of the invention is characterized in that the unsaturated polyester (A) has a theoretical double bond equivalent weight from 140 to 1000 g/mol, preferably from 200 to 800 g/mol, particularly preferably from 300 to 600 g/mol, still more preferably from 400 to 500 g/mol.

It is also favorable for the allyl prepolymer (B) to have a double bond equivalent weight of from 250 to 2000 g/mol, preferably from 250 to 1000 g/mol, more preferably from 300 to 500 g/mol, and particularly preferably from 300 to 400 g/mol.

Restricting the double bond equivalent weights of resins (A) and (B) to the ranges mentioned leads to an optimal cross-linking density of the powder coating wherein both stability and flexibility can be optimized which results in a superior resistance to cold fluids simultaneously with a good swelling capacity of the powder coat layer. Moreover it was shown that higher double bond equivalent weights give rise to an insufficient chemical resistance of the powder coatings to solvents, such as methyl ethyl ketone (MEK), as well as to cold fluids. Excessively high double bond equivalent weights lead to a reduced cross-linking density of the powder coating and to reduced mechanical and chemical stability. On the other side, excessively low double bond equivalent weights result in a very high cross-linking density and, thus, in an unsatisfactory swelling capacity. In addition, side reactions may increasingly occur particularly in the synthesis of polyesters of very low double bond equivalent weights. Without being bound by theory it is assumed that it increasingly comes to additions of alcohols onto the unsaturations of the polyester in these cases, known as "Ordelt saturation".

Another preferred embodiment of the powder coating formulation of the invention includes a thermal initiation system (C), in which the temperature, at which the half-life of the at least one thermal initiator is one minute (in the following called $T_{1/2}$), is from 80 to 150° C., preferably from 90 to 140° C., particularly preferably from 100 to 130° C. In further preferred embodiments, the thermal initiation system additionally contains an accelerator to lower the $T_{1/2}$, and/or an inhibitor to offset early developing initiator radicals and to consequently prevent early cross-linking reactions of the binding agent. Curing the coating on heat-sensitive substrates is made possible by appropriately selecting the components of the thermal initiation system, and additionally, the lower temperature limit and the optional addition of inhibitors are preventing a premature, undesired initiator degradation.

In a particularly preferred embodiment, the powder coating formulation of the invention is characterized in that the thermal initiation system (C) includes a peroxide, preferably a dialkyl peroxide, a diacyl peroxide or a perester. Basically, other thermal initiators are possible as well. It is essential for the selection of the thermal initiator or thermal initiation system (C) of the invention that the $T_{1/2}$ of the thermal initiator, which may optionally be adjusted by adding accelerators or by adding inhibitors, be in a temperature range similar to the cross-linking temperature of the binding agent. The lower temperature limit for the binder components, i.e. the at least one partially crystalline, unsaturated polyester (A) and the allyl prepolymer (B), to become cross-linked is substantially dependent upon the melting point of the polyester of the invention and the reactivity of the unsaturations. Is the temperature, at which the half-life of the peroxide is one minute, markedly below the cross-linking temperature of the binder system, then this may result in undesired, sometimes odorous degradation products. Moreover, a part of the initiator gets lost which would be required for the polymerization, i.e. the curing of the coating. Not least, unwanted pre-reactions during the extrusion process may occur. An unfavorable combination of thermal initiation system (C) and binder system, consisting in components (A) and (B), which results in a degradation of the peroxide below the melting point of the at least one partially crystalline, unsaturated polyester (A), leads to unsatisfactory results with regard to chemical resistance, resistance to cold test fluids und swelling capacity of the final powder coat layer. This last mentioned properties are also connected to the dosage of the peroxide.

Besides the $T_{1/2}$ mentioned before, the dosage of the peroxide is also of relevance. Excessively low peroxide doses may lead to insufficient cross-linking of the binder components, which in turn results in an insufficient chemical resistance, poor swelling capacity and a deficient resistance to cold test fluids. Excessively high peroxide concentrations, on the other hand, may result in pre-reactions during processing, storage problems, and odorous degradation products which may cause blooming. The dosing of the peroxide is again subject to the chemical structure of the peroxide.

Further it is favorable if the proportion of the unsaturated polyester (A) in the powder coating formulation of the invention is between 20-80%, preferably 40-75%, based on the binding agent. Surprisingly, by using the defined amount of the at least one partially crystalline, unsaturated polyester (A) in combination with the highly viscous allyl prepolymer (A) according to the embodiment of the invention, a satisfactory flowing/leveling can be achieved, because, above the melting range of the said component (A), this results in a marked decline of the otherwise relatively high melting viscosity of the powder coating caused by the allyl prepolymer.

Another preferred embodiment refers to a powder coating formulation of the invention including a proportion of allyl prepolymer (B) of between 20-80%, preferably 20-60%, based on the binding agent. The amorphous, copolymerizable allyl prepolymer (B), which has a higher melting viscosity than polyester (A) at the curing temperature of the powder coating, thereby serves as a counterpart to the partially crystalline, unsaturated polyester (A), the combination of which in the stated concentration ranges yields the mentioned advantages with respect to processing, flowing/leveling, and storage stability.

Surprisingly, it was shown that the before-mentioned concentration ranges of the at least one partially crystalline polyester and the at least one allyl prepolymer result in a system allowing the use of thermal initiation systems of adequate half-life in an appropriate concentration range which ensures sufficiently high reactivity with curing temperatures from 120° C. on to be able to coat temperature-sensitive substrates on one hand, and on the other permits a sufficiently good processability, i.e. no noticeable pre-reactions in the extruder, and good flowing/leveling.

The object of the present invention will now be explained in more detail referring to the following examples, wherein the powder coating formulation of the invention is not restricted to the specific compositions stated in the examples.

DEFINITIONS

Within the scope of the invention, the at least one partially crystalline, unsaturated polyester (A) is understood to be a polymer, which is produced by adequate processes, such as polycondensation of bi- or multi-functional organic acids and/or anhydrides, and bi- or multi-functional alcohols, or by transesterification of, for example, methyl esters of the bi- or multifunctional organic acids, and has a minimum melting enthalpy, as determined by DSC with a heating rate of 20 K/min, of greater or equal to 40 J/g. Within the context of the present invention, the terms crystalline and partially crystalline polyester are used synonymously, as there are no polymers with a 100% degree of crystallization. The unsaturated sites in the polyester may be achieved by using appropriate monomers, such as unsaturated alcohols or acids or derivatives thereof. Within the scope of the invention, monomers favoring crystallization are particularly suitable, such as symmetrical compounds or compounds favoring the formation of hydrogen bonds. Within the scope of the invention, symmetrical compounds are those having at least one symmetrical axis. Preferably, compounds showing a very low tendency to form side chains are employed (for example bi-functional alcohols and acids). The polyester (A) may also include aromatic or cycloaliphatic monomers. Examples of monomers which can be used in the production of polyester (A), are terephthalic acid, isophthalic acid, ortho-phthalic acid, hexahydroterephthalic acid, tetrahydroterephthalic acid, benzoic acid, para-tert-butylbenzoic acid, cinnamic acid, crotonic acid, endomethylene tetrahydrophthalic acid, tetrachlorophthalic acid, 2,6-naphthalene dicarboxylic acid, 3,6-dichlorophthalic acid, cyclohexane dicarboxylic acid, adipic acid, succinic acid, nonanoic diacid, decanoic diacid, trimellitic acid, trimellitic acid anhydride, 4,4'-oxybis(benzoic acid), fumaric acid, maleic acid, maleic acid anhydride, itaconic acid, citraconic acid, mesaconic acid, neopentyl glycol, ethylene glycol, diethylene glycol, dipropylene glycol, 1,2-propanediol, 1,3-propanediol, 1,2-butanediol, 1,3-butanediol, 1,4-butanediol, 1,6-hexanediol, 2,5-hexanediol, 1,4-cyclohexane dimethanol, 2,2-bis[4-(2-hydroxyethoxy)phenyl]propane, 2,3-butenediol, glycerol, hexanetriol, trimethylolethane, trimethylolpropane, triethylene glycol, tetraethylene glycol, pentaethylene glycol, hexaethylene glycol, isosorbide, and pentaerythritol; however, other monomers may be used as well.

Within the scope of the invention, the at least one allyl prepolymer (B) is understood to be a polymer, including allyl groups which may subsequently undergo chemical reactions, wherein this polymer is produced by radical polymerization, ionic polymerization, polyaddition, polycondensation or ring-opening polymerization or the like. The production of the prepolymer may be achieved in a way known to someone skilled in the art by polymerization of monomers containing allyl groups, such as pentaerythritol allylether, 2-allyloxy ethanol or trimethylol propane allylether and/or by chemical functionalization of polymers with compounds containing allyl groups. In one embodiment, the allyl prepolymer is a polyester, containing allyl groups, wherein the synthesis of the polyester may be performed in a way known to someone skilled in the art by using appropriate monomers, such as the monomers listed above (under polyester (A)). In addition, compounds containing allyl groups are being used already during the synthesis and/or for a subsequent functionalization.

The viscosity of the at least one allyl prepolymer is determined according to ISO 3104 as a 50% solution (% w/w) in MEK at 30° C. The number average molar mass is determined by gel permeation chromatography. For an eluent, chloroform is used at a flow rate of 1 ml/min. Calibration of the separation columns (three columns of 8 mm×300 mm each, PSS SDV, 5 μm, 100, 1000 and 100000×) is done by narrowly distributed polystyrene standards, and detection via refractive index detector.

Within the scope of the invention, both the melting points and the melting enthalpy were determined by DSC measurement based on ISO 11357-3. The measurement was done at 20 K/min. The values stated in this invention for melting point and melting enthalpy refer to the Peak Melting Temperature and the Enthalpy of Melting stated in the standard. For determining the maximum of the cross-linking exothermy $T_{cure}$ the same heating rate and the same temperature range are used, respectively. $T_{cure}$ is determined in the same way as for the Peak Melting Temperature, but instead of the endothermal peak of the melting the exothermal crosslinking peak is made use of. As is understood by someone skilled in the art, care has to be taken to ensure that no noticeable curing reaction has taken place in optional previous heating processes of DSC.

The double bond equivalent weight of the at least one partially crystalline, unsaturated polyester (A) is determined by the ratio of the total mass (in g, unless stated differently) of the polyester produced and the quantity of substance (in mol, unless stated differently) of the unsaturated monomer used for the production or the sum of the quantities of substance of the unsaturated monomers used for the production. The double bond equivalent weight of the at least one allyl prepolymer (B) is determined by calculating by means of the iodine number, as determined according to ISO 3961. The conversion is done according to the following equation:

$$\text{Double bond equivalent weight of allyl prepolymer} = \frac{\text{iodine number by ISO 3961} * \text{weighed portion of allyl prepolymer}}{\text{molar mass } (I_2)}$$

The proportion of the partially crystalline, unsaturated polyester (A) is calculated from the employed quantity of the polyester of the invention, based on the total amount of the binding agent according to the following equation:

$$\text{Proportion of polyester } [\%] = \frac{100 * m_{polyester}}{(m_{polyester} + m_{allyl\ prepolymer})}$$

Herein, m (polyester) refers to the mass of the one or more polyesters, whereas m (allyl prepolymer) refers to the weighed portion of the one or more allyl prepolymers. The proportion of allyl prepolymer (B), based on the binding agent, is determined analogously:

$$\text{Proportion of allyl prepolymer} [\%] = \frac{100 * m_{allyl\ prepolymer}}{(m_{polyester} + m_{allyl\ prepolymer})}$$

In case the binding agent does not contain just one/more polyesters and just one/more allyl prepolymers, then the sum of ($m_{polyester}+m_{allyl\ prepolymer}$) is to be understood as the sum of all binder components, i.e. the sum of all employed polymers.

The acid value (AV) is determined analogously to ÖNORM EN ISO 2114 with the difference that a mixture of 28 parts of acetone and 1 part of pyridine (% w/w) is used for a solvent. As a solvent for the partial acid value, a mixture of 5 parts of pyridine and 1 part of methanol is used.

The ydroxyl value (HV) is determined according to ÖNORM EN ISO 4629.

EXAMPLES

Powder coatings of the invention, which include the components listed in the following tables, were produced as follows:

The individual components, except for the thermal initiator, were weighed and mixed with a Thermo Prism Pilot-3 laboratory mixer. Subsequently, the thermal initiator was added, the powder coating batch was once again homogenized by vigorous manual shaking and thereafter extruded on a Coperion ZSK 18 having six casing lengths. The temperature settings of the extruder were 40/40/70/70/60. The extruder was run at 1000 revolutions per minute. The hot extrudate was cooled on a cooling roll (T=4° C.) and was grinded following a recrystallization period of 24 hours on an ACM-2L impact classifier (Hosokawa Alpine). The final powder coatings had an average particle size (d50) of 25-50 μm. Medium density fiber boards (MDF) were coated with these powder coatings and were placed in a gas catalytic IR oven from Heraeus at 135° C. für 4 min for curing. The coating thickness of the surface area was in the range of 125±25 μm, the coating thickness on the edge of the powder coat layer was 125±25 μm.

The unsaturated, partially crystalline polyester required for the powder coating formulations of the invention were produced by polycondensation. The typical procedure for producing the polyesters was as follows:

A glass flask of 2 l volumetric capacity was selected for a laboratory apparatus, which was equipped with a reflux condenser to reduce monomer loss (especially of alcohols), an agitator, and a temperature sensor. The alcohol components were placed first into the flask and the entire apparatus was rendered inert with nitrogen. After heating to a temperature of approx. 70-80° C., the catalyst, the stabilizers, and the acid components were added. Still subjected to rendering inert and slight negative pressure (by applying a water jet pump), the temperature was elevated to 200° C. and was maintained until no reaction water was forming any more. Following this, the pressure was reduced gradually to 500 mbar as to suppress foaming as much as possible, and this value was maintained for 10 min. Following another reduction to 300 mbar and maintaining for 5 hours, the resin was collected, cooled down, broken, and grinded.

The formulations used for the production of polyester (A) are shown in table 1. In addition to the monomers given in table 1, approx. 0.1% Irgafos 168 and 0.2% catalyst (organotin compounds or stannic oxide) were added.

The formulations used for the production of allyl prepolymer (B) are shown in table 2. The properties of the employed allyl prepolymer (B) are given in table 6. The production of allyl polyesters (allyl PE) 1 to 4 was performed in the way known to someone skilled in the art similar to the synthesis of polyester with the exception of applying temperatures of up to 240° C.

The quality of the surfaces, which were coated with the powder coating formulations (see tables 3 and 4 for compositions) of the invention, was evaluated subject to various criteria as listed in the following.

The testing of satisfactory curing of the formulations at the curing temperatures selected in each case was performed by means of a qualitative rapid test, the so-called MEK test. In addition, further tests were performed, such as for resistance to cold fluids and for swelling capacity of the powder coatings of the invention.

In the MEK test, three drops of methyl ethyl ketone are dropped onto the surface to be tested. After 20 sec, the solvent is dapped off with a paper towel. Following another 60 sec, the resistance is examined with a hardness testing rod having a test force of 1 N and a width of the tester probe of 0.75 mm. The evaluation of the result is performed based on ÖNORM EN 12720. Results with a score of three to five (no scratches on test surface, none to moderate alterations of test surface) are rated as good, with a score of two as sufficient (slight scratches on the test surface are visible; considerable alteration of the test surface), and with a score of one as insufficient (deep scratches (partially showing detachment of the coating from the substrate), severe alteration of the test surface).

The resistance to cold fluids was examined on the basis of ÖNORM EN 12720. The test fluids are coffee and ethanol (45% v/v), for one or six hours, respectively, paraffin and deionized water, for 24 h each. For the swelling capacity in the meaning of the invention, the so-called Ledro test according to IKEA specifikation IOS-TM-0022 ist made use of.

Within the scope of the invention, an extrusion is judged to be successful if it proceeds without any noticeable pre-reactions in the extruder. Pre-reactions are recognized by a premature, at least partial polymerization of the powder coating. These pre-reactions take place when the temperature of the extrudate is too close to the temperature at which the half-life of the thermal initiator within the respective thermal initiation system is one minute. Experience has shown that this was the case at outlet temperatures starting from approx. $T_{1/2}-10°$ C. on, in some cases from $T_{1/2}-20°$ C. or $T_{1/2}-30°$ C. on.

Further, the processability was determined on the basis of any sticky residues during processing. This refers to the extrusion process, i.e. a sticking to the cooling unit (for example the cooling roll) of the extruder. This is recorded in the present invention as "sticking" in case of adhesions to the cooling roll or to the cooling belt, or is otherwise recorded as "no sticking". Herein, sticking is understood to be a phenomenon that needs additional mechanical impact for the formulation to be detached from the cooling unit.

Examples 1-5 describe comparative examples of formulations which do not all show the desired properties with regard of processability and mechanical properties of the produced coating layer.

Example 1

In this formulation, the DAP prepolymer concentration based on the binding agent is outside the preferred relevant range of the invention. The high viscosity caused by the high percentage of DAP prepolymer (based on the binding agent of 67%) results in a too high heating of the powder coating formulation and, therefore, in too pronounced pre-reactions during the extrusion, when using DAP iso. No extrudate for the testing in coating trials/examinations could be yielded. Accordingly, prepolymers having a lower viscosity were employed in the following (see examples 12 to 17), which prepolymers could then be used in a concentration range up to 80%, based on the binding agent.

Example 2 (Comparative)

The composition of example 2 comprises a polyester having a melting temperature of 124° C. Due to the high melting point, the polyester does melt only insufficiently before the curing. Hence, this results in an insufficiently cured coating film which is reflected by a bad result in the MEK test and the Ledro test, as well as in a deficient resistance to cold fluids.

Example 3 (Comparative)

Example 3 comprises a polyester having a melting point below the interval mentioned in the invention. This results in problems during processing, such as sticking during the pilot run and following extrusion on the cooling roll. It was not possible to produce powder coatings with this batch, and therefore, the test results were not entered into table 2.

Example 4

The stated composition of the powder coating has double bond equivalents outside the preferred range and, consequently, a low cross-linking density. Processing of the powder coating was successful, however, the coating showed inferior results in the tests with regard to resistance to cold fluids and to MEK, which is unsuitable for some applications.

Example 5

Example 5 describes a powder coating formulation in a non-preferred embodiment having a thermal initiation system with insufficient reactivity for the coating of some temperature-sensitive substrates. At the curing conditions stated of 135° C. for four minutes, no optimum of curing the powder coating could be achieved which manifested itself in an inferior resistance to cold fluids and to MEK, as well as an insufficient swelling capacity.

Examples 6-10

Examples 6-10 describe formulations according to the present invention. For all formulations, both superior processability and swelling resistance were observed in the Ledro test.

TABLE 1

Partially crystalline thermoplastic unsaturated polyester (A)

|  | Fumaric acid | Maleic acid anhydride | Succinic acid | 1,6-Hexanediol | 1,4-Butanediol | Theoretical double bond equivalent weight | AV | HV | $T_m$ |
|---|---|---|---|---|---|---|---|---|---|
| PE 1 | 18.4 |  | 34.7 | 8.5 | 38.1 | 527 | 12.3 | 42.3 | 107 |
| PE 2 | 18.8 |  | 35.5 |  | 45.5 | 514 | 9.3 | 33.4 | 124 |
| PE 3 | 18 |  | 29.1 | 52.6 |  | 550 | 4.3 | 50.5 | 70 |
| PE 4 | 4.1 |  | 20.5 | 3.92 | 22.9 | 1200 | 8 | 28.4 | 105 |
| PE 5 |  |  | 29.0 |  | 38.1 | 401 | 10.0 | 37.7 | 111 |
| PE 6 |  | 16.1 | 35.8 | 8.8 | 39.3 | 527 | 19.1 | 26.8 | 57 |

TABLE 2

Allyl prepolymer (B)

|  | Iso-phthalic acid | Adipinic acid | Succinic acid | 1,6-Hexanediol | 1,4-Butanediol | 2,2-Dimethyl-1,3-propanediol | Trimethylol propane | Trimethylol-propane monoallyl ether | Penta-erythritol allylether | Theoretical double bond equivalent weight | AV | HV |
|---|---|---|---|---|---|---|---|---|---|---|---|---|
| Allyl PE 1 | 56.6 | 1.1 |  |  |  | 31.2 | 0.9 | 10.2 |  | 1500 | 8.8 | 26.3 |
| Allyl PE 2 | 55.4 | 1.1 |  |  |  | 27.3 | 0.9 | 15.3 |  | 1000 | 7.8 | 26.3 |
| Allyl PE 3 | 53.5 | 1.0 |  |  |  | 21.7 | 0.9 | 22.8 |  | 675 | 8.4 | 23.2 |
| Allyl PE 4 | 23.4 |  | 25.6 | 4.1 | 28.3 |  |  |  | 18.5 | 1610 | 5.1 | 27.0 |

TABLE 3

Powder coating formulations

|  | Example 1 | Comp. example 2 | Comp. example 3 | Example 4 | Example 5 | Example 6 | Example 7 | Example 8 | Example 9 | Example 10 |
|---|---|---|---|---|---|---|---|---|---|---|
| PE 1 | 23.28 |  |  |  | 39.56 | 40.17 | 40.17 | 40.11 |  |  |
| PE 2 |  | 40.21 |  |  |  |  |  |  |  |  |
| PE 3 |  |  | 40.21 |  |  |  |  |  |  |  |
| PE 4 |  |  |  | 47.88 |  |  |  |  |  |  |
| PE 5 |  |  |  |  |  |  |  |  | 35.91 | 35.91 |
| DAP iso* | 43.23 |  | 26.29 |  | 25.94 | 26.33 |  | 26.29 | 30.59 |  |
| DAP A* |  | 26.29 |  |  |  |  |  |  |  | 30.59 |
| DAP S* |  |  |  | 18.62 |  |  | 26.33 |  |  |  |
| tert-Butylhydro-quinone[1] |  |  |  |  |  |  |  |  | 0.10 | 0.05 |
| Modaflow Powder 6000[2] | 1.50 | 1.50 | 1.50 | 1.50 | 1.50 | 1.50 | 1.50 | 1.50 | 1.50 | 1.50 |
| Ti-Select TS 6200[3] | 27.00 | 27.00 | 27.00 | 27.00 | 27.00 | 27.00 | 27.00 | 27.00 | 27.00 | 27.00 |
| BP 50 SE[4] | 5.00 | 5.00 | 5.00 | 5.00 |  | 5.00 | 5.00 | 5.00 | 5.00 | 5.00 |
| PK 295 P[5] |  |  |  |  | 6.00 |  |  |  |  |  |
| Pre-reactions during extrusion | yes | no | no | no | no | no | no | no | no | no |

TABLE 3-continued

Powder coating formulations

|  | Example 1 | Comp. example 2 | Comp. example 3 | Example 4 | Example 5 | Example 6 | Example 7 | Example 8 | Example 9 | Example 10 |
|---|---|---|---|---|---|---|---|---|---|---|
| Sticking to cooling unit | — | yes | yes | no | no | no | no | no | no | no |
| MEK test | — | 1 | — | 2 | 1 | 3 | 3 | 2 | 3 | 3 |
| Ledro test/h | — | 4 | — | 8 | 4 | 48 | 48 | 48 | 24 | 48 |
| coffee 1 h | — | 3 | — | 3 | 2 | 5 | 5 | 4 | 5 | 4 |
| coffee 6 h | — | 2 | — | 2 | 2 | 5 | 4 | 2 | 5 | 3 |
| ethanol 1 h | — | 3 | — | 5 | 4 | 5 | 5 | 5 | 5 | 5 |
| ethanol 6 h | — | 2 | — | 5 | 3 | 5 | 5 | 5 | 5 | 5 |
| paraffin 24 h | — | 5 | — | 5 | 5 | 5 | 5 | 5 | 5 | 5 |
| water 24 h | — | 5 | — | 5 | 5 | 5 | 5 | 5 | 5 | 5 |

[1]Company Merck KGaA, Darmstadt, Germany
[2]Leveling agent of company Allnex Holding S.à r.l., Luxembourg, Luxembourg
[3]Titanium dioxide of company Chemours, Wilmington, Delaware, USA
[4]Dibenzoyl peroxide of company Pergan, Bocholt, Germany
[5]1,1-Di-(tert-butylperoxy)-3,3,5-trimethyl-cyclohexanes of company Pergan, Bocholt, Germany Note: In cells, into which no values were entered, the testing could not be performed (for example for reasons of pre-reactions in the extruder or very strong sticking to the cooling unit such that no extrudate could be obtained). Grayed out columns denote comparative examples.

The following examples 11 and 12 are again descriptions of comparative formulations, which do not have the desired properties with regard to processability and mechanical properties of the produced coating layer. Examples 13-18 describe formulations according to the present invention.

Example 11 (Comparative)

In this formulation, the melting point of the unsaturated polyester (A) is outside the relevant range of the invention. As in example 3, this results in problems during processing, such as adhesion during the pilot run and sticking to the cooling roll. It was not possible to produce powder coatings with this batch, and therefore, the test results were not entered into table 3.

Example 12 (Comparative)

In this formulation, the viscosity of the allyl prepolymer (B) is outside the range of the invention. Surprisingly, this results in problems during processing, such as adhesion during the pilot run and sticking to the cooling roll. It was not possible to produce powder coatings with this batch, and therefore, the test results were not entered into table 3.

Examples 3-18

Examples 13-18 describe formulations according to the present invention. For all formulations, both superior processability and swelling resistance were observed in the Ledro test.

TABLE 4

Powder coating formulations

|  | Comp. example 11 | Comp. example 12 | Example 13 | Example 14 | Example 15 | Example 16 | Example 17 | Example 18 |
|---|---|---|---|---|---|---|---|---|
| PE 1 |  | 21.95 | 40.80 | 17.50 | 23.24 | 29.50 | 24.99 | 21.12 |
| PE 6 | 16.60 |  |  |  |  |  |  |  |
| DAP iso |  |  | 20.20 |  |  |  | 8.40 | 4.59 |
| Allyl PE 1 | 50.40 |  |  | 49.50 |  |  | 33.61 | 41.30 |
| Allyl PE 2 |  |  |  |  | 43.76 |  |  |  |
| Allyl PE 3 |  |  |  |  |  | 37.50 |  |  |
| Allyl PE 4 |  | 45.05 |  |  |  |  |  |  |
| Modaflow Powder 6000 | 1.50 | 1.50 | 1.50 | 1.50 | 1.50 | 1.50 | 1.50 | 1.50 |
| Ti-Select TS 6200 | 27.00 | 27.00 | 27.00 | 27.00 | 27.00 | 27.00 | 27.00 | 27.00 |
| BP 50 SE | 5.00 | 5.00 |  | 5.00 | 5.00 | 5.00 | 5.00 | 5.00 |
| PO[6] |  |  | 5.00 |  |  |  |  |  |
| FeCl$_2$[7] |  |  | 0.02 |  |  |  |  |  |
| Tris(2-pyridyl-methyl)amine[8] |  |  | 0.02 |  |  |  |  |  |
| Pre-reactions during extrusion | no | no | no | no | no | no | no | no |
| Sticking to cooling unit | yes | yes | no | no | no | no | no | no |
| MEK test | — | — | 2 | 2 | 3 | 3 | 2 | 2 |
| Ledro test/h | — | — | 24 | 48 | 48 | 48 | 48 | 48 |
| coffee 1 h | — | — | 4 | 4 | 5 | 5 | 5 | 4 |
| coffee 6 h | — | — | 2 | 3 | 4 | 4 | 3 | 3 |
| ethanol 1 h | — | — | 5 | 5 | 5 | 5 | 5 | 5 |
| ethanol 6 h | — | — | 5 | 5 | 5 | 5 | 5 | 5 |

TABLE 4-continued

Powder coating formulations

| | Comp. example 11 | Comp. example 12 | Example 13 | Example 14 | Example 15 | Example 16 | Example 17 | Example 18 |
|---|---|---|---|---|---|---|---|---|
| paraffin 24 h | — | — | 5 | 5 | 5 | 5 | 5 | 5 |
| water 24 h | — | — | 5 | 5 | 5 | 5 | 5 | 5 |

[6]tert-Butyl peroxy-2-ethylhexanoate of company Pergan, Bocholt, Germany
[7]Ferrous chloride water-free of company Sigma-Aldrich Handels GmbH, Vienna, Austria
[8]Tris(2-pyridylmethyl)amine of company Sigma-Aldrich Handels GmbH, Vienna, Austria Note: In cells, into which no values were entered, the testing could not be performed (for example for reasons of pre-reactions in the extruder or very strong sticking to the cooling unit such that no extrudate could be obtained). Grayed out columns denote comparative examples.

TABLE 5

Viscosities and double bond equivalent weights of allyl prepolymers (B)

| | double bond equivalent weight in g/mol | viscosity in 50% MEK, 30° C. (measured according to ISO 3104)/mPas | Weight-average molar mass Mw/g/mol |
|---|---|---|---|
| DAP iso* | | 50-150 | 30-50000 |
| DAP A* | | 70-110 | 50-60000 |
| DAP S* | | 50-70 | 30-40000 |
| Allyl PE 1 | 1500 | 33 | 14100 |
| Allyl PE 2 | 1000 | 49 | 13500 |
| Allyl PE 3 | 675 | 44 | 16100 |
| Allyl PE 4 | 1610 | 13 | 11500 |

*The values were taken from the data sheets of company OSAKA SODA.

The double bond equivalent weight of allyl prepolymer (B) DAP iso, DAP A, and DAP S was within the range of the invention.

The invention claimed is:

1. A powder coating formulation, comprising at least one partially crystalline thermoplastic unsaturated polyester (A), at least one thermoplastic allyl prepolymer (B), which is copolymerizable with said polyester, and a thermal initiation system (C), including at least one thermal initiator, wherein the allyl prepolymer (B) has a weight average molar mass greater than 5000 g/mol, and/or has a viscosity of 30 mPas to 200 mPas, and wherein the unsaturated polyester (A) has a melting point of between 90 and 120° C.

2. The powder coating formulation of claim 1, wherein the allyl prepolymer (B) has a weight average molar mass greater than 20000 g/mol, and/or has a viscosity of 50 mPas and 150 mPas, and wherein the unsaturated polyester (A) has a melting point of between 90 and 100° C.

3. The powder coating formulation of claim 1, wherein the allyl prepolymer (B) is a polymer of ortho- or meta-phthalic acid diallyl ester.

4. The powder coating formulation of claim 1, wherein the allyl prepolymer (B) is a polyester comprising allyl groups.

5. The powder coating formulation of claim 1, wherein the unsaturated polyester (A) has a double bond equivalent weight of 140 to 1000 g/mol.

6. The powder coating formulation of claim 5, wherein the unsaturated polyester (A) has a double bond equivalent weight of 400 to 500 g/mol.

7. The powder coating formulation of claim 1, wherein the allyl prepolymer (B) has a double bond equivalent weight of 250 to 2000 g/mol.

8. The powder coating formulation of claim 7, wherein the allyl prepolymer (B) has a double bond equivalent weight of 300 to 400 g/mol.

9. The powder coating formulation of claim 1, wherein the thermal initiation system (C) comprises at least one thermal initiator, which is characterized by having a temperature, at which its half-life is one minute, of between 80 and 150° C.

10. The powder coating formulation of claim 9, wherein the thermal initiation system (C) comprises at least one thermal initiator, which is characterized by having a temperature, at which its half-life is one minute, of between 100 and 130° C.

11. The powder coating formulation of claim 1, wherein the thermal initiation system (C) comprises a peroxide.

12. The powder coating formulation of claim 11, wherein the peroxide is a dialkyl peroxide, a diacyl peroxide, or a perester.

13. The powder coating formulation of claim 1, wherein the proportion of the partially crystalline thermoplastic unsaturated polyester (A) is between 20-80%, based on the binding agent.

14. The powder coating formulation of claim 13, wherein the proportion of the partially crystalline thermoplastic unsaturated polyester (A) is between 40-75%, based on the binding agent.

15. The powder coating formulation of claim 1, wherein the proportion of the allyl prepolymer (B) is between 20-80%, based on the binding agent.

16. The powder coating formulation of claim 15, wherein the proportion of the allyl prepolymer (B) is between 20-60%, based on the binding agent.

* * * * *